P. W. GREEN.
LUBRICATOR.

No. 250,805.　　　　　　　　Patented Dec. 13, 1881.

WITNESSES:　　　　　　　　INVENTOR:

UNITED STATES PATENT OFFICE.

PAUL W. GREEN, OF PHILADELPHIA, PENNSYLVANIA.

LUBRICATOR.

SPECIFICATION forming part of Letters Patent No. 250,805, dated December 13, 1881.

Application filed December 15, 1879.

*To all whom it may concern:*

Be it known that I, PAUL W. GREEN, of the city and county of Philadelphia, and in the State of Pennsylvania, have invented a new and useful Improvement in Lubricators, of which the following is a specification.

My improvements relate to lubricators for engine-cylinders, and have for their object to supply a regulated quantity of oil or tallow to the cylinder at every stroke of the piston, and prevent pressure upon the oil in the reservoir.

The construction and operation will be more particularly described with reference to the accompanying drawings.

Figure 1:
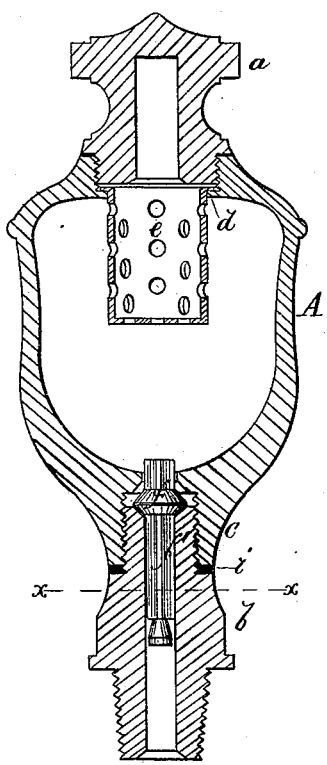
Figure 2:
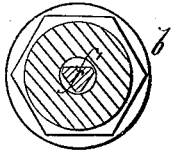

Figure 1 is a central vertical section of my lubricator, and Fig. 2 is a horizontal section on line $x\ x$ of Fig. 1.

Similar letters of reference indicate corresponding parts.

A is the cup or reservoir, fitted with a screw-cap, $a$, for removal when oil is to be poured in the cup, and with an apertured stem, $b$, at the bottom, that is attached by screwing into the threaded socket $c$, and the stem $b$ is also formed with a threaded end for attachment to the engine-cylinder. The aperture that receives the screw-cap $a$ is formed with an internal shoulder, $d$, to support by its flange a cup-shaped strainer, $e$, which receives and strains oil poured into the cup A.

The strainer can be readily removed for cleaning when the cap $a$ is off.

The bottom of the cup A opens by an aperture into the socket $c$ and passage of stem $b$. The under part of this aperture and the upper end of the stem $b$ are formed with slots for a puppet-valve, $f$, which is ground at opposite sides to fit the two valve-seats, and is held in a concentric position by its stem $f'$, that extends into the passage of $b$. The valve $f$ rests upon the lower seat when not raised by pressure, thereby permitting oil to run from the cup A into the chamber below the orifice and around the valve. When the valve is raised by pressure it closes against the upper seat, and allows escape of the oil in the space beneath it to the outlet-passage of stem $b$. The extent of movement of the valve is varied by screwing on the stem $b$, the reservoir thereby allowing a more or less free escape of oil from the cup, and varying the size of the chamber around the valve.

The stem $b$ may have a washer around it, as at $i$, to prevent the stem from entering too far, and additional washers may be applied, as required.

It will be seen that with this lubricator applied to an engine-cylinder at the movement of the piston in one direction the valve will rise and oil enter the cylinder, and on the return stroke the valve will fall and a regulated quantity of oil pass from the cup to the chamber around the valve. The pressure is cut off from the oil in cup A, so that it may readily be filled while the engine is running.

Having thus described my invention, I claim as new and desire to secure by Letters Patent—

The oil-cup A, having cap $a$ and strainer $e$, in combination with the stem $b$ and duplex valve $f$, constructed and arranged substantially as set forth.

PAUL WILBRAHAM GREEN.

Witnesses:
 ALEXR. E. TURNER,
 HENRY C. WARNICK.